United States Patent [19]

Hirano

[11] 4,416,341

[45] Nov. 22, 1983

[54] COMBINATION WEIGHING MACHINE

[75] Inventor: Takashi Hirano, Kobe, Japan

[73] Assignee: Yamata Scale Company, Ltd., Hyogo, Japan

[21] Appl. No.: 323,951

[22] Filed: Nov. 23, 1981

[30] Foreign Application Priority Data

Dec. 4, 1980 [JP] Japan .................................. 55-171736
Mar. 11, 1981 [JP] Japan .................................. 56-35629

[51] Int. Cl.³ ............................................ G01G 19/22
[52] U.S. Cl. .......................................... 177/25; 177/1; 364/567
[58] Field of Search ....................... 177/25, 1; 364/567

[56] References Cited

U.S. PATENT DOCUMENTS 4,267,894 5/1981 Hirano et al. .................... 364/567 X
4,336,852 6/1982 Hirano ................................. 177/25
4,336,853 6/1982 Hirano ................................. 177/25
4,360,070 11/1982 Hirano ................................. 177/25

Primary Examiner—George H. Miller, Jr.
Attorney, Agent, or Firm—Eugene E. Geoffrey, Jr.

[57] ABSTRACT

A combination weighing machine, used for packing a plurality of articles in individual bags or the like so that the weight of each pack becomes substantially equal to a predetermined target value, by weighing a plurality of articles by a plurality of weighing balances at the same time and combining some of them appropriately to form a group of articles having a total weight approximating to the target value, and constructed such that a pair of combinations providing total weights which are nearest the target value of all are searched and selected out of a predetermined set of combinations respectively for both positive and negative deviations with respect to the target value, thereby enabling the election of one of them in accordance with a predetermined order of preference.

7 Claims, 11 Drawing Figures

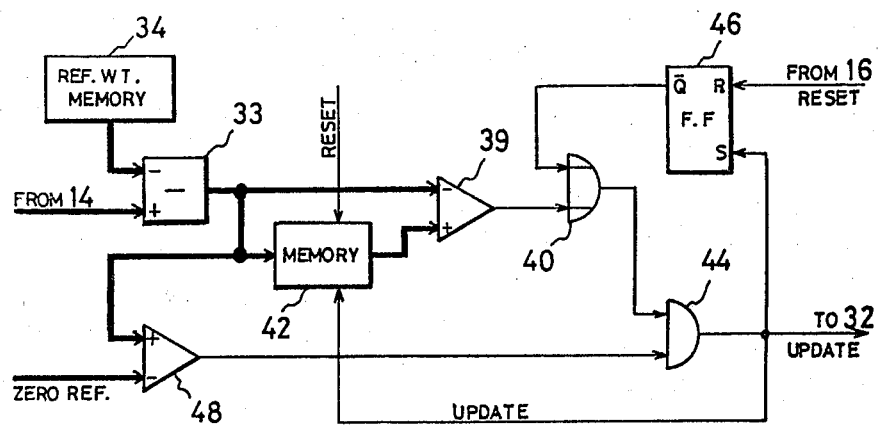
F I G. 3
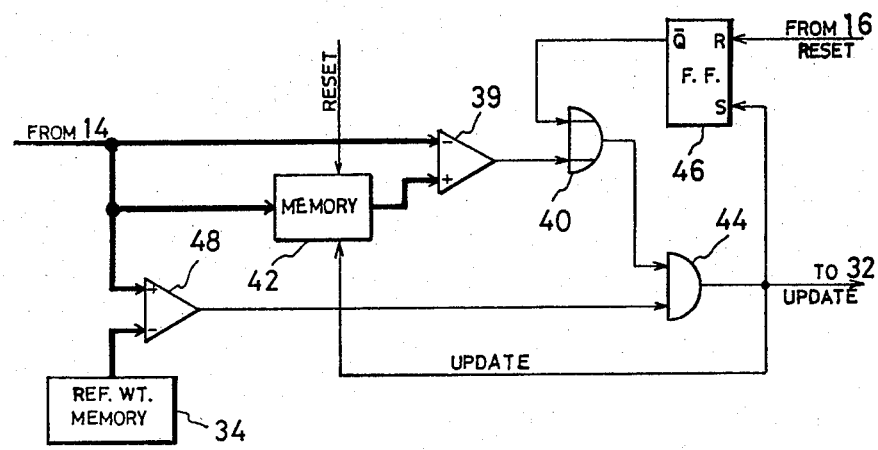
F I G. 4
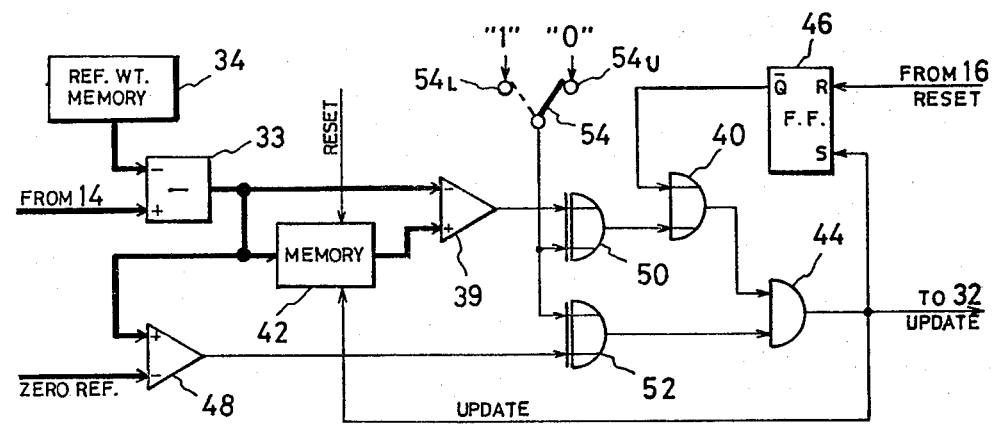
F I G. 5

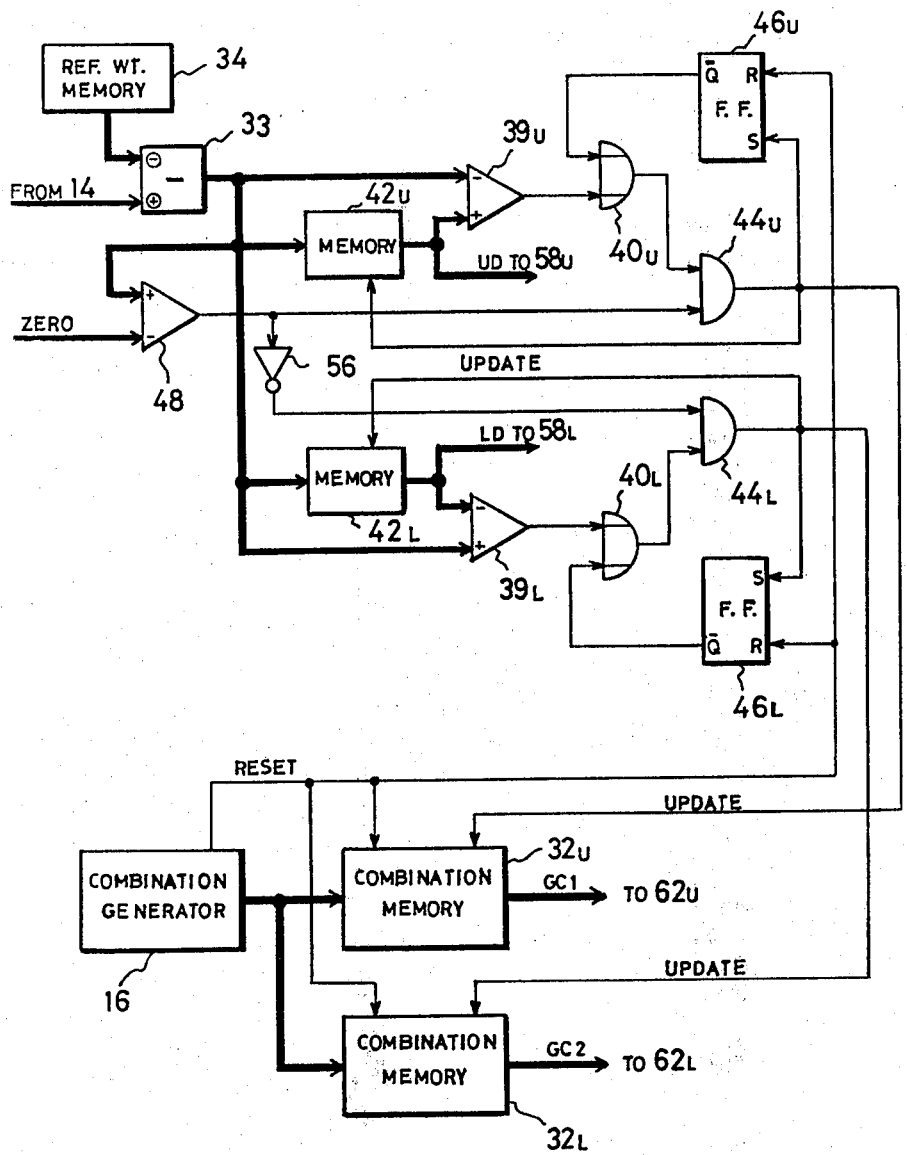
FIG. 6
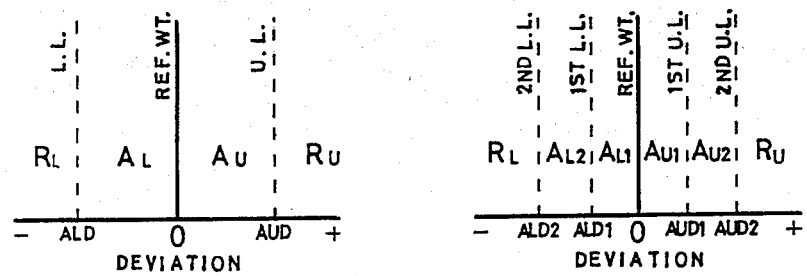
FIG. 9
FIG. 11

COMBINATION WEIGHING MACHINE

This invention relates to an improved combination weighing machine and, especially, to a combination weighing machine which can extract a combination which provides a weight approximating as close as possible to the target value and, moreover, select the weight optionally in either upper or lower side of the target value.

A combination weighing machine is generally used for packing a plurality of articles, such as cakes, candies and vegetables, in individual bags or the like in such a manner that each pack contains the articles having a substantially fixed total weight. According to the principle of this machine, as disclosed in U.S. Pat. No. 3,939,928 cited herein as a reference, a plurality of articles are weighed respectively by a plurality of weighing balances at the same time, the resultant weight indicating signals are combined in various fashion and summed to produce sum signals successively, which are then compared with predetermined upper and lower limits of weight, and, when the sum falls within the predetermined range, signals are supplied to the weighing balances belonging to this combination to collect the articles thereon.

In the case of packing articles as above, it is often desirable that the weight of the contents of each pack approximates as close as possible to the target value and, particularly, it may be desired also to make it greater (or less) than the target value. In the prior art combination weighing machine as above, the weights of the respective packs are generally scattered at random over a predetermined range, though they are sure to fall within this range. Although the abovementioned objects would be attained if the predetermined upper and lower limits should be established severely, this would result in reduction of probability of acquisition of the wanted combination and consequent reduction of working efficiency. Accordingly, it is desired to provide a combination weighing machine which can select a combination providing a total weight which is nearest the target weight out of all of the predetermined combinations, with the allowable range of weight preset to be suitably wide. The U.S. Pat. No. 4,267,894 granted to this inventor et al discloses such an improved combination weighing machine as above. However, the combination weighing machine of this patent can handle the weight in only one of the upper and lower sides of the target value, since it has no means for discriminating the polarity of the measured weight with respect to the target value.

Accordingly, a first object of this invention is to provide a combination weighing machine which can select a combination providing a total weight which is above or below the target value and nearest thereto, out of all of the predetermined combinations, and can optionally specify the upper or lower side as occasion demands.

A second object of this invention is to provide a combination weighing machine which can, when the predetermined combinations include no combination providing a total weight which is in a predetermined one of the upper and lower sides of the target value and falls within a predetermined allowable range, select automatically a combination providing a total weight which is in the opposite side of the target value and nearest thereto.

In accordance with this invention, a combination weighing machine comprises a plurality of weighing balances for weighing articles and producing an electric signal indicative of the measured weight of each article, an adder having a plurality of input terminals for summing incoming signals to produce a sum signal, a plurality of control gates coupled respectively between the weighing balances and the input terminals of the adder, a combination generator having a plurality of output terminals coupled respectively to the control terminals of the gates for producing outputs successively in accordance with predetermined combinations at its outputs to open the gates in accordance with the combinations, a discriminator for comparing the sum signal with a predetermined target value and producing an output signal when a deviation of the sum signal with respect to the target value is less than any of the previously experienced deviations, and a combination memory having input terminals coupled respectively to the output terminals of the combination generator and responding to the output signal of the discriminator by updating the content with the current combination inputs. Upon completion of the predetermined combinations, the content of the combination memory is discharged to utilization means.

As a feature of this invention, the abovementioned discriminator includes means for discriminating the polarity of deviation of the abovementioned total weight with respect to the target value, and means for specifying the polarity of deviation to be handled. In a preferred embodiment of this invention, separate discriminators and combination memories are provided for the upper and lower sides of the target value, that is, positive and negative polarities of the deviation, and, when the deviation of the specified polarity does not fall within a predetermined allowable range upon completion of the predetermined combinations, combination outputs having provided the opposite polarity deviation are discharged from the corresponding combination memory.

These and other objects and features of this invention will be understood more clearly from the following description with reference to the accompanying drawings.

IN THE DRAWINGS

FIG. 3 is a block circuit diagram representing a basic configuration of discriminator circuit of the combination weighing machine according to this invention;

FIG. 4 is a block diagram representing a variation of the circuit of FIG. 3;

FIG. 5 is a block circuit diagram representing an embodiment of discriminator circuit of the combination weighing machine according to this invention;

FIG. 6 is a block circuit diagram representing a main portion of another embodiment of the combination weighing machine according to this invention;

FIG. 9 is a diagram illustrating the operation of the circuits of FIGS. 7 and 8;

FIG. 11 is a diagram illustrating the operation of the circuit of FIG. 10.

Figure 1:
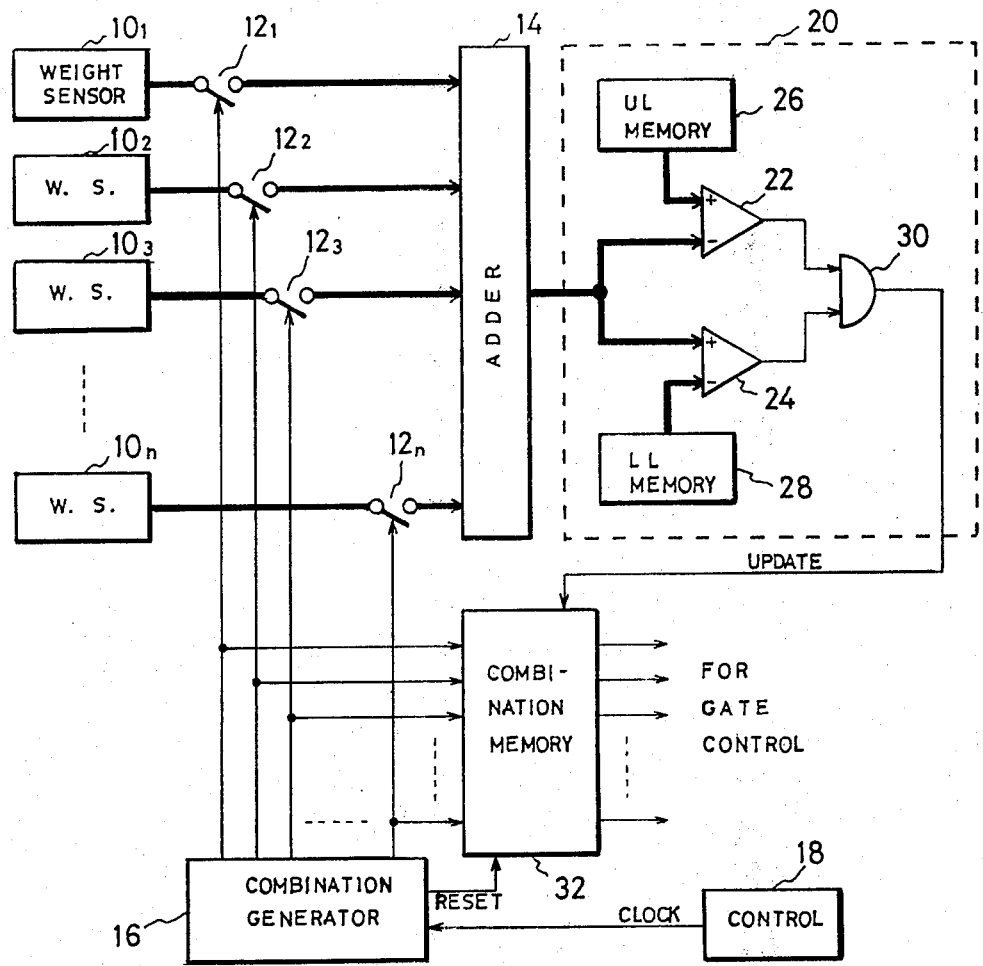
FIG. 1 is a block diagram representing a typical construction of a combination weighing machine according to the prior art.

Throughout the drawings, like reference numerals are used to denote like structural components and the numerals for the components exclusive to the upper and lower sides of the target value are affixed respectively with letters U and L. In the drawings, thick solid lines are transmission lines for analog or digital quantities indicating signals or multi-bit digital signals, and thin solid lines are transmission lines for binary monobit signals representing "1" or "0".

Referring to FIG. 1, the combination weighing machine is provided with a plurality (n-number) of weighing balances (not shown) having weight sensors $10_1$, $10_2$, $10_3$, ... $10_n$, each of which produces an electric signal indicative of the weight of articles in the weighing cradle of the corresponding balance. The output weight signals from the weight sensors $10_1$, $10_2$, $10_3$, ... $10_n$ are supplied respectively through controlled normally-open switches $12_1$, $12_2$, $12_3$, ... $12_n$ to an adder 14. Control terminals of the normally-open switches $12_1$, $12_2$, $12_3$, ... $12_n$ are coupled respectively to corresponding output terminals of a combination generator 16.

The combination generator 16 is driven by a clock pulse train supplied from a control circuit 18 and produces output signals of "1" or "0" each from the respective output terminals in accordance with a predetermined set of mathematical combinations. The normally-open switches $12_1$, $12_2$, $12_3$, ... $12_n$ are closed respectively by "1" outputs and pass the corresponding weight signals to the adder 14. As well known in the art, there are $(2^n+1)$ combinations in total of the n-number of output terminals of the combination generator 16. In order to produce combination outputs corresponding to all of these combinations, the combination generator 16 may be composed of an n-bit binary counter for counting clock pulses from the control circuit 18, and the bit outputs are coupled in parallel to the output terminals, respectively. The combination generator 16 is cleared every time there is a completion of all of the predetermined combinations, and then produces a reset signal RESET.

The adder 14 sums up the incoming weight signals and supplies a sum signal to a judging circuit 20 as shown by a dashed block. The judging circuit 20 includes comparators 22 and 24 and the sum signal is applied to the second input of the comparator 22 and the first input of the comparator 24. An upper limit (UL) memory 26 is coupled to the first input of the comparator 22 and a lower limit (LL) memory 28 is coupled to the second input of the comparator 24. Each of these comparators supplies its output signal to an AND gate 30 when the first input is greater in magnitude than the second input. The memories 26 and 28 have input devices (not shown) such as conventional keyboards and store respectively predetermined allowable upper and lower limit values of the combined weights. Accordingly, the AND gate 30 will produce an output update signal UPDATE to apply it to a combination memory 32, when the sum signal is within an allowable range defined by the upper and lower limits. The combination memory 32 has inputs coupled respectively to the outputs of the combination generator 16, and serves to store the current outputs of the combination generator 16 and also outputs them from its corresponding output terminals in response to the update signal from the AND gate 30. These outputs correspond respectively to the balances contributing to the above allowable combined weight and are utilized for indicating these balances and (or) driving unloading and loading gates thereof. At the end of each cycle of combinations, the combination generator 16 applies a reset signal RESET to the combination memory 32 to clear it.

Figure 2:
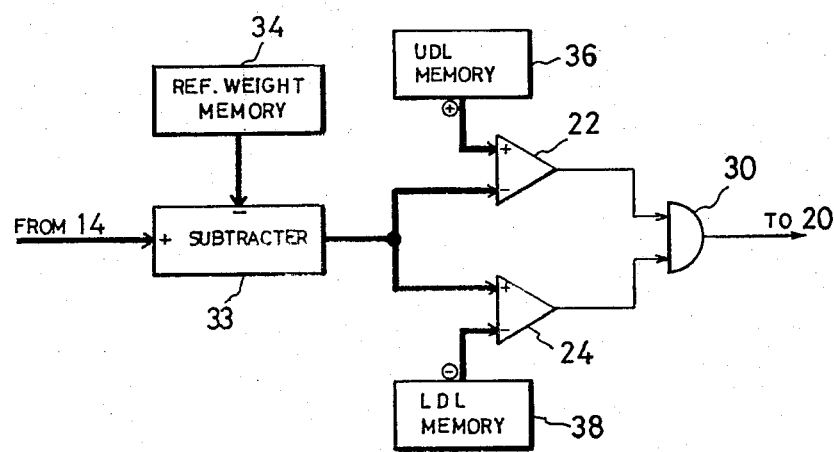
FIG. 2 is a block diagram representing another configuration of the discriminator circuit of FIG. 1 according to the prior art.

FIG. 2 shows a variation of the judging circuit 20 of FIG. 1, according to the prior art. The sum signal from the adder 14 is applied to one input of a subtracter 33, the other input of which is coupled to the output of a reference weight memory 34. The reference weight memory 34 has a structure similar to those of the above-mentioned memories 26 and 28 and stores a previously predetermined reference weight, that is, intended total weight. The subtracter 33 subtracts the reference weight from the memory 34 from the sum signal from the adder 14 to produce a signal indicative of deviation of the current total weight from the reference weight. Of course, this deviation signal has positive or negative polarity unless it equals to zero. The output deviation signal of the subtracter 33 is applied to the second input of the first comparator 22 and to the first input of the second comparator 24. The first input of the first comparator 22 is coupled to the output of an upper deviation limit (UDL) memory 36 and the second input of the second comparator 24 is coupled to the output of a lower deviation limit (LDL) memory 38. The upper and lower deviation memories 36 and 38 are similar to those memories as described above and previously store an allowable upper deviation (positive value) and an allowable lower deviation (negative value), respectively. The comparators 22 and 24 and the AND gate 30 operate similarly to those described with reference to FIG. 1, and the AND gate 30 produces an output UPDATE when the sum signal is within the allowable range as in the arrangement of FIG. 1.

The judging circuit of FIG. 2 appears to be somewhat complicated over that of FIG. 1, but has the advantage of easier numerical setting due to no need of calculation of the upper and lower limits of weight. Moreover, when the upper and lower deviations are equal in magnitude, the comparator 24, memory 38 and AND gate 30 can be omitted by handling the deviation in absolute value.

In arrangements as shown in FIGS. 1 and 2, the combination memory 32 produces combined outputs contributing to the formation of the sum signal which has first fallen within the allowable range during each combination generating cycle of the combination generator 16. However, it is not always the case that this sum is nearest the intended or reference weight though it is within the allowable range. In general, consumers prefer the total weight greater and greater than the reference weight but vendors prefer the former nearer and nearer the latter. Also, consumers hate generally the total weight falling below the reference weight. A judging circuit constructed to satisfy these requirements is shown in FIG. 3.

As in the arrangement of FIG. 2, the output sum signal of the adder 14 (FIG. 1) is applied to the second input of the subtracter 33 and the first input is supplied from the reference weight memory 34, and the subtracter 33 supplies a (positive or negative) deviation signal to the second input of a comparator 39, to the first input of a polarity discriminating comparator 48 and to the input of a memory 42. The output of the memory 42 is coupled to the first input of the comparator 39 and the output of the comparator 39 is coupled to one input of an OR gate 40. The output of the OR gate 40 is applied to one input of an AND gate 44 which receives the output of the comparator 48 at the other input. The output of the AND gate 44 is applied to the set terminal S of a flip-flop 46 and also to the control terminals of the memory 42 and the combination memory 32 (FIG. 1) as their update signals. The reset terminal R of the flip-flop 46 is coupled for receiving the reset signal from the combination generator 16, and the Q terminal is coupled to the other input of the OR gate 40.

At the end of each combination cycle, the combination generator 16 provides RESET signal to clear the combination memory 32 as described previously, and, at the same time, to reset the flip-flop 46 to apply a high level signal "1" from its Q terminal through the OR gate 40 to the AND gate 44. A standard zero weight signal is applied to the second input of the polarity discriminating comparator 48 from a suitable signal source (not shown). The comparator 48, which is arranged to produce "1" output when the first input is greater than the second input, applies the output to the AND gate 44 when the deviation signal from the subtracter 33 is positive. Thus, the AND gate 44 produces an output UPDATE signal to cause the combination memory 32 to store the current combination, and to set the flip-flop 46. The UPDATE signal also causes the memory 42 to store the current output deviation signal of the subtracter 33. Then, the deviation signal produced from the subtracter 33 is compared with the content of the memory 42 by the comparator 39, and the comparator 39 supplies an output through the OR gate 40 to the AND gate 44 when the subtracter output is less than the memory content. When the current deviation is positive, the AND gate 44 produces an output UPDATE signal, as described above, to update the content of the combination memory 32 with the current combined inputs and, at the same time, to update the content of the memory 42 into the current deviation input. When the deviation is negative, the polarity discriminating comparator 48 does not open the AND gate 44. Accordingly, the content of the memory 42 is pulled down by every UPDATE signal and the memory will store the least positive deviation of that cycle just before it is cleared by the reset signal from the combination generator 16. Then, the combination memory 32 will produce combined outputs contributing to this least deviation.

The circuit shown in FIG. 4 is a relatively simple circuit which provides a similar effect to that of the FIG. 3 circuit. In this circuit, the subtracter 33 of FIG. 3 is omitted and the sum signal from the adder 14 is directly applied to the comparators 39 and 48 and to the memory 42. Moreover, instead of the standard zero weight signal, the output of the reference weight memory 34 is applied to the second input of the polarity discriminating comparator 48. The comparator 48 is arranged to produce an output when the sum signal is greater than the content of the memory 34, and provides the same effect as in the case of FIG. 3. On the other hand, the memory 42 stores the total weight rather than the deviation and the comparator 39 produces an output when the current total weight is less than the content of the memory 39. Consequently, the content of the memory 39 is drawn nearer the reference weight by every UPDATE signal.

While the circuits of FIGS. 3 and 4 can handle positive deviation only, it may be desired to handle negative deviations in some cases. The circuit of FIG. 5 is an improved modification of the judging circuit of FIG. 3, which is arranged to allow election or presetting of either positive or negative deviation. This circuit is constructed by inserting EXCLUSIVE OR gates 50 and 52 between the comparator 39 and the OR gate 40 and between the comparator 48 and the AND gate 44 of the circuit FIG. 3, respectively, and connecting the movable arm 54 of a single-pole double-throw switch to the other inputs of the EXCLUSIVE OR gates 50 and 52. The fixed contacts $54_U$ and $54_L$ of the switch are connected respectively to suitable potential sources (not shown) to receive voltage levels corresponding to binary codes "0" and "1", respectively.

Assuming now the switch arm 54 being turned to the contact $54_U$ to apply binary "0" level to the EXCLUSIVE OR gates 50 and 52, the gates 50 and 52 will supply their outputs "1" to the OR gate 40 and the AND gate 44 respectively, only when the outputs of the comparators 39 and 48 are both "1". This operation is exactly the same as that of the FIG. 3 circuit. Assuming next the switch arm 54 being turned to the contact $54_L$ to apply binary "1" level to the EXCLUSIVE OR gates 50 and 52, the gates 50 and 52 will produce "1" outputs only when the outputs of the comparators 39 and 48 are "0" level. This operation is a complete inversion of that of the FIG. 3 circuit and the content of the memory 42 is a negative deviation which approaches zero successively.

Although, in the circuit of FIG. 5, the polarity of deviation handled can be optionally preset, it is impossible to handle both polarities of deviation at the same time. FIG. 6 shows a circuit arranged to allow concurrent handling of both positive and negative deviations in accordance with this invention. In this arrangement, a first judging circuit for positive deviation including a memory $42_U$, a comparator $39_U$, an OR gate $40_U$, an AND gate $44_U$ and a flip-flop $46_U$ and a second judging circuit for negative deviation including a memory $42_L$, a comparator $39_L$, an OR gate $40_L$, an AND gate $44_L$ and flip-flop $46_L$ are coupled in parallel to the subtracter 33 and the polarity discriminating comparator 48 of FIG. 3, and the outputs of the AND gates $44_U$ and $44_L$ are applied respectively to the control terminals of first and second combination memories $32_U$ and $32_L$ which are coupled in parallel to the outputs of the combination generator 16. In this circuit configuration, the first judging circuit is essentially the same as the circuit of FIG. 3 and processes positive deviations in the same manner as the latter to produce desired combined outputs corresponding to a positive deviation from the first combination memory $32_U$ at the end of each combination cycle. In the second judging circuit, the output of the polarity discriminating comparator 48 is inverted by the invertor 56 and applied to the AND circuit $44_L$ and, therefore, only a negative deviation is stored in the memory $42_L$. Since the comparator $39_L$ is arranged to produce an output when the content of the memory $42_L$ is less than the current deviation (the former is greater than the latter in absolute value), the output of the comparator $39_L$ updates the memory $42_L$ and, at the same time, the second combination memory $32_L$ every time, and the second combination memory $32_L$ also produces desired combined outputs corresponding to a negative deviation at the end of each combination cycle.

Figure 7:
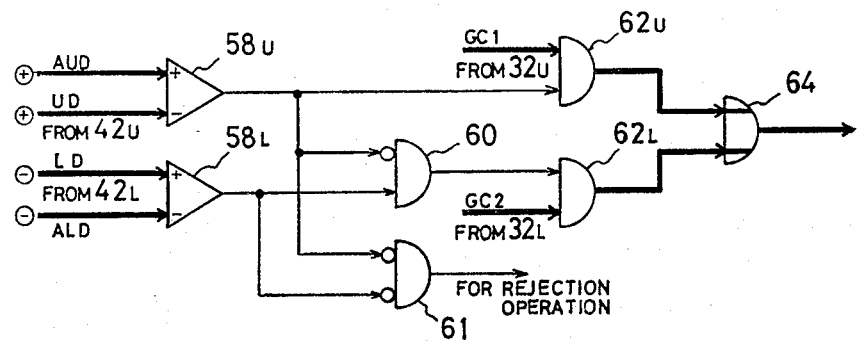
FIGS. 7 and 8 are logic circuit diagrams representing two embodiments of selection circuits of this invention utilizing the structure of FIG. 6.

FIG. 7 shows a first embodiment of polarity selection circuit used in the circuit of FIG. 6. This circuit includes a comparator $58_U$ having a second input for receiving the output UD (positive) of the memory $42_U$ of FIG. 6 and a comparator $58_L$ having a first input for receiving the output LD (negative) of the memory $42_L$ of FIG. 6. An allowable upper deviation (AUD) signal (positive) and an allowable lower deviation (ALD) signal (negative) are applied respectively to the first input of the comparator $58_U$ and the second input of the comparator $58_L$ from allowable upper and lower deviation memories (not shown) such as the memories 36 and 38, respectively. The comparators $58_U$ and $58_L$ are arranged to produce an output "1" each when the first input is greater than the second input, that is, when the current deviation is within a predetermined allowable range. The output of the comparator $58_U$ is applied to the inversion input of an AND gate 60, one inversion input of an AND gate 61 and the control input of an AND gate $62_U$, and the output of the comparator $58_L$ is applied to the non-inversion input of the AND gate 60 and the other inversion input of the AND gate 61. The output of the AND gate 60 is applied to the control input of an AND gate $62_L$. Control outputs $GC_1$ and $GC_2$ of the combination memories $32_U$ and $32_L$ of FIG. 6 are supplied respectively to the main inputs of the AND gates $62_U$ and $62_L$ the outputs of which are coupled to both inputs of an OR gate 64.

When the combination memories $32_U$ and $32_L$ supply their outputs $GC_1$ and $GC_2$ respectively to the AND gates $62_U$ and $62_L$ at the end of each cycle of combination of the combination generator 16, if the positive deviation UD in the memory $42_U$ is less than the allowable upper deviation AUD and the negative deviation LD in the memory $42_L$ is greater than the allowable lower deviation ALD (that is, if both deviations are within a predetermined allowable range), both comparators $58_U$ and $58_L$ produce high level outputs the inversions of which in turn close the AND gates 60 and 61. Thus, the output of the comparator $58_U$ opens the AND gate $62_U$ only which passes the content of the combination memory $32_U$ through the OR gate 64 to the corresponding balances. (It is easily understood that the same result is obtained when the negative deviation is out of the allowable range). However, if the positive deviation UD is out of the allowable range, the output of the comparator $58_U$ becomes low level and the AND gate 60 is opened instead of the AND gate $62_U$ to open the AND gate $62_L$. Therefore, the content $GC_2$ of the combination memory $32_L$ is sent through the AND gate $62_L$ and the OR gate 64 to the corresponding balances. If both positive and negative deviations are out of the allowable range, both comparators $58_U$ and $58_L$ produce low level outputs and only the AND gate 61 is opened. The output of the AND gate 61 is used for trouble processing, such as trouble indication and automatic operation for replacement or addition of the articles.

The operation of the circuit of FIG. 7 gives an effect as follows in FIG. 9 showing ranges of weight:
(1). Selecting first a combination having a weight within a range $A_U$ between the reference weight and the upper limit;
(2). Selecting a combination having a weight within a range $A_L$ to the lower limit when the desired combination was not found within the range $A_U$; and,
(3). Taking other means when the desired combination was not found within the allowable range.

Such a procedure results in more combinations having weights near the reference weight and fewer combinations having weights below the reference weight as compared with the prior art procedure where only the upper and lower limits of weight are preset and a combination having weight between both limits are picked up at random. Moreover, working efficiency of the machine is further improved over the case where the allowable lower deviation ALD is made smaller in the prior art arrangement.

Figure 8:
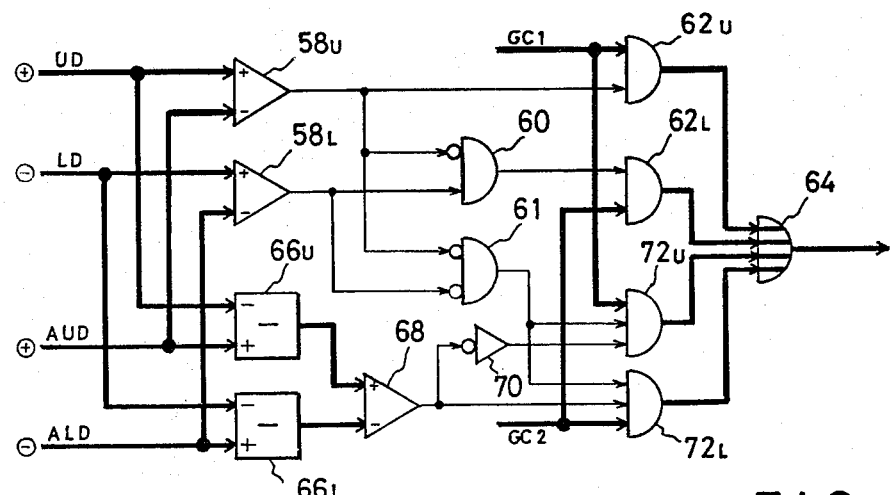

Even in the circuit of FIG. 7, however, normal operation of the machine is interrupted in the third case where the AND gate 61 produces an output. Therefore, it is often preferable to adopt also those combinations having weights out of the allowable range unless the weight tolerance is especially severe. When the contents of the memories $42_U$ and $42_L$ are respectively out of the allowable upper and lower deviations AUD and ALD, it should be desirable to elect one of them the deviation of which is nearer the AUD or ALD than the other. FIG. 8 shows a variation of the circuit of FIG. 7, which has been constructed in accordance with this requirement.

The circuit of FIG. 8 is the same as the FIG. 7 circuit, except that elements 66 through 77 have been added. For the purpose as abovementioned, there are provided a subtracter $66_U$ for subtracting the allowable upper deviation AUD from the positive deviation UD and a subtracter $66_L$ for subtracting the negative deviation LD from the allowable lower deviation ALD. When both deviations in question are out of the allowable range, the numerical outputs of both subtracters are positive an indicative of distances from the upper and lower limits, respectively. The comparator 68 compares both distances and produces a high level output when the distance to the upper limit is larger (when the negative deviation is to be elected). This output of the comparator 68 is applied through an invertor 70 to an AND gate $72_U$ and directly to an additional AND gate $72_L$. The other two inputs of the AND gate $72_U$ are the output of the AND gate 61 and the output $GC_1$ of the combination memory $32_U$, and other two inputs of the AND gate $72_L$ are the output of the AND gate 61 and the output $GC_2$ of the combination memory $32_L$. The outputs of the AND gates $72_U$ and $72_L$ are applied to the OR gate 64 as same as the outputs of the AND gates $62_U$ and $62_L$.

It is easily understood that, when at least one of the contents UD and UL of the memories $42_U$ and $42_L$ is within the range $A_U$ or $A_L$ of FIG. 9, the circuit of FIG. 8 operates the same as the circuit of FIG. 7 and produces the output $GC_1$ or $GC_2$ through the AND gates $62_U$ or $62_L$. When both UD and UL are within the ranges $R_U$ and $R_L$, respectively, the AND gate 61 produces a high level output as in the case of the circuit of FIG. 7. In this case, if the distance between UD and AUD is less than the distance between LD and ALD, the comparator 68 produces a low level output and, therefore, the AND gate $72_U$ opens to supply the content $GC_1$ of the combination memory $32_U$. In a case opposite to the above, the comparator 68 produces a high level output to open the AND gate $72_L$ to supply the content $GC_2$ of the combination memory $32_L$ to the OR gate 64. Although a part of the combined weights will come out of the allowable range with this procedure, the normal operation of the machine will not be interfered with by the combined weights.

Figure 10:
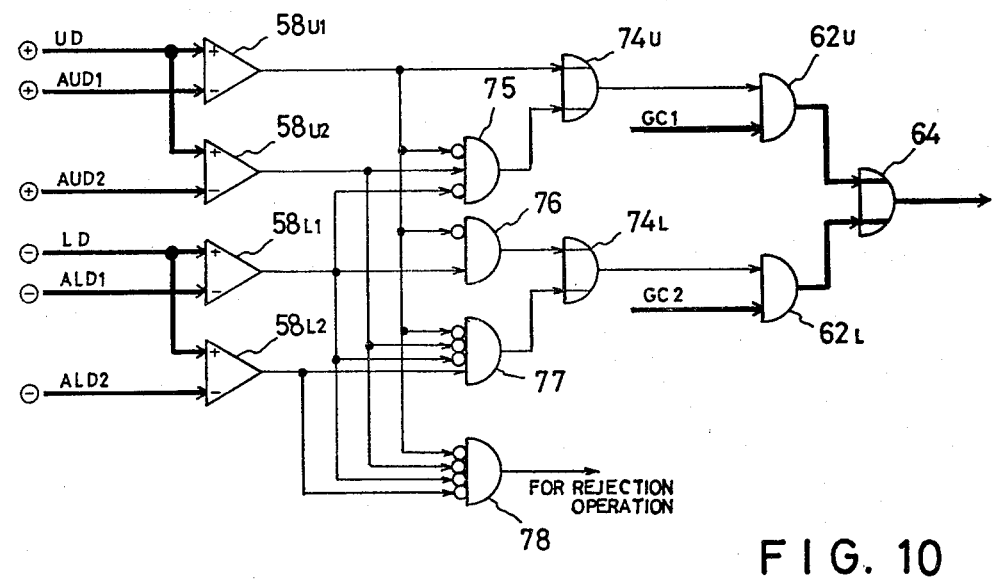
FIG. 10 is a logic circuit diagram representing another embodiment of the selection circuit of this invention utilizing the structure of FIG. 6.

The circuit of FIG. 10 is a second variation of the circuit of FIG. 7, in which, as shown in FIG. 11, second upper and lower limits $AUD_2$ and $ALD_2$ are established outside the first upper and lower limits $AUD_1$ and $ALD_1$, and the selection of combined weights is effected in the order of preference of the ranges $A_{U1}$, $A_{L1}$, $A_{U2}$ and $A_{L2}$ and those within the ranges $R_U$ and $R_L$ are rejected as unusable, in order to reduce a danger of unrestricted adoption of the combined weights outside the allowable range as in the circuit of FIG. 8.

This circuit includes four comparators $58_{U1}$, $58_{U2}$, $58_{L1}$ and $58_{L2}$. The content UD of the memory $42_U$ is applied to the first inputs of the comparators $58_{U1}$ and $58_{U2}$ and the content LD of the memory $42_L$ is applied to the first inputs of the comparators $58_{L1}$ and $58_{L2}$. First and second allowable upper deviation signals $AUD_1$ and $AUD_2$ are applied to the second inputs of the comparators $58_{U1}$ and $58_{U2}$, respectively, and first and second allowable lower deviation signals $ALD_1$ and $ALD_2$ are applied to the second inputs of the comparators $58_{L1}$ and $58_{L2}$, respectively, from suitable signal sources (not shown), respectively. The output of the comparator $58_{U1}$ is coupled to the input of an OR gate $74_U$ and inversion inputs of AND gates 75, 76, 77 and 78, the output of the comparator $58_{U2}$ is coupled to the non-inversion input of the AND gate 76 and inversion inputs of the AND gates 77 and 78, the output of the comparator $58_{L1}$ is coupled to the non-inversion input of the AND gate 76 and inversion inputs of the AND gates 75, 77 and 78, and the output of the comparator $58_{L2}$ is coupled to the non-inversion input of the AND gate 77 and inversion input of the AND gate 78. The output of the AND gate 75 is applied to the other input of the OR gate $74_U$, the outputs of the AND gates 76 and 77 are applied to two inputs of the OR gate $74_L$ and the output of the AND gate 78 is used the same as the output of the AND gate 61 of FIG. 7. The outputs of the OR gates $74_U$ and $74_L$ are applied to one input of each of the AND gates $62_U$ and $62_L$, the other inputs of which are coupled to receive the control signals $GC_1$ and $GC_2$, respectively.

In operation, when the deviation UD is within the range $A_{U1}$ of FIG. 11, the comparator $58_{U1}$ produces a high level output to close the AND gates 75, 76, 77 and 78 and to open the AND gate $62_U$ only through the OR gate $74_U$, thereby outputting the corresponding control signal $GC_1$. When the deviation UD is out of the range $A_{U1}$ and the deviation LD is within the range $A_{L1}$, the comparator $58_{L1}$ produces a high level output to close the AND gates 75, 77 and 78 and the comparator $58_{U1}$ produces a low level output to close the AND gate $62_U$ and open the AND gate 76. Consequently, the output of the comparator $58_{L1}$ is applied through the AND gate 76 and the OR gate $74_L$ to the AND gate $62_L$ to output the corresponding control signal $GC_2$. When the deviation is out of the range $A_{L1}$ and the deviation UD is within the range $A_{U2}$, the comparator $58_{U2}$ produces a high level output to close the AND gates 77 and 78 and the comparators $58_{U1}$ and $58_{L1}$ produce low level outputs to open the AND gate 75 and to close the AND gate 76. Consequently, the output of the comparator $58_{U2}$ is applied through the AND gate 75 and the OR gate $74_U$ to the AND gate $62_U$ to output the corresponding control signal $GC_1$. When the deviation LD is within the range $A_{L2}$ and the deviation UD is out of the ranges $A_{U1}$ and $A_{U2}$, the comparators $58_{U1}$ and $58_{U2}$ produce low level outputs to close the AND gates $62_U$, 75 and 76 and open the AND gate 77 and the comparator $58_{L2}$ produces a high level output to close the AND gate 78 and to open the AND gate $62_L$ through the AND gate 77 and the OR gate $74_L$. Consequently, the corresponding control signal $GC_2$ is output through this AND gate $62_L$. Finally, when the deviations UD and LD are within the ranges $R_U$ and $R_L$, respectively, the four comparators produce low level outputs and, therefore, only the AND gate 78 is opened to produce an output which is used the same as the output of the AND gate 61. In this case, both control signals $GC_1$ and $GC_2$ of the balances are not fed out.

As described above, by separately storing and processing positive and negative deviations and corresponding combined signals by the arrangement of this invention, it is possible to optionally control distribution of the weights of respective packages of articles and, thereby, to fulfill the weight condition while maintaining the machine efficiency.

While the circuits of FIGS. 6 through 10 are constructed based upon the circuit of FIG. 3 which handles deviations from a predetermined reference weight, it is easy for those skilled in the art to construct such circuits based upon the circuit of FIG. 4 so as to handle measured weights and predetermined upper and lower limits of weight. It is also easy for them to design arrangements having different order of preference of range selection.

What is claimed is:

1. A combination weighing machine, comprising a plurality of weighing balances for weighing articles respectively to produce electric signals indicative of the measured weights, an adder having a plurality of inputs for summing incoming signals to produce a sum signal, a plurality of controlled normally-open switches coupled respectively between said balances and said inputs of said adder, a switch control circuit having a plurality of output terminals coupled respectively to the control terminals of said switches for producing control signals from those of said output terminals which are successively selected in accordance with a predetermined set of combinations to close corresponding ones of said switches and producing an end signal upon completion of all of said combinations, a judging circuit coupled to the output of said adder for comparing said sum signal with a predetermined reference value to produce an acceptance signal when a predetermined condition with respect to said reference value is fulfilled, and a combination memory coupled to the output terminals of said switch control circuit for updating its content with the current inputs in response to said acceptance signal and supplying its content to utilization means in response to said end signal, said judging circuit including a subtracter coupled to the output of said adder to calculate deviation of said sum signal from a predetermined target value, a polarity discriminating comparator coupled to the output of said subtracter for discriminating the polarity of said deviation to produce an output in the case of a predetermined polarity, a deviation memory coupled to the output of said subtracter for updating its content with the current input in response to said acceptance signal, a comparator having inputs coupled to the outputs of said subtracter and said deviation memory for producing an output signal when the absolute value of the former output is less than the absolute value of the latter output, a pair of EXCLUSIVE OR gates with one OR gate having an input coupled to the output of the last said comparator and the other OR gate having an input coupled to said polarity discriminating comparator, polarity specifying means for applying a signal selectively to the other inputs of said EXCLUSIVE OR gates to specify desired polarity, and an AND circuit connected to said EXCLUSIVE OR gates for producing said acceptance signal in response to the output signals of said EXCLUSIVE OR gates.

2. A combination weighing machine, comprising a plurality of weighing balances for weighing articles respectively to produce electric signals indicative of the measured weights, an adder having a plurality of inputs for summing incoming signals to produce a sum signal, a plurality of controlled normally-open switches coupled respectively between said balances and said inputs of said adder, a switch control circuit having a plurality of output terminals coupled respectively to the control terminals of said switches for producing control signals from those of said output terminals which are successively selected in accordance with a predetermined set of combinations to close corresponding ones of said switches and producing an end signal upon completion of all of said combinations, a judging circuit coupled to the output of said adder for comparing said sum signal with a predetermined reference value to produce an acceptance signal when a predetermined condition with respect to said reference value is fulfilled, and a combination memory coupled to the output terminals of said switch control circuit for updating its content with the current inputs in response to said acceptance signal and supplying its content to utilization means in response to said end signal, said judging circuit including a polarity discrimination comparator coupled to the output of said adder for discriminating polarity of deviation of said sum signal with respect to a predetermined target value to produce an output signal in case of a predetermined polarity, a sum memory coupled to the output of said adder for responding to said acceptance signal to update its content with the current input, a comparator coupled to said adder and sum memory for comparing the output of said adder with the content of said sum memory to produce an output signal when the former is nearer said target value than the latter, a pair of EXCLUSIVE OR gates with one OR gate having an input coupled to the output of the last said comparator and the other OR gate having an input coupled to said polarity discriminating comparator, polarity specifying means for applying a signal selectively to the other inputs of said EXCLUSIVE OR gates to specify desired polarity and an AND circuit connected to said EXCLUSIVE OR gates for producing said acceptance signal in response to the output signals of said EXCLUSIVE OR gates.

3. A combination weighing machine, comprising a plurality of weighing balances for weighing articles respectively to produce electric signals indicative of the measured weights, an adder having a plurality of inputs for summing incoming signals to produce a sum signal, a plurality of controlled normally-open switches coupled respectively between said balances and said inputs of said adder, a switch control circuit having a plurality of output terminals coupled respectively to the control terminals of said switches for producing control signals from those of said output terminals which are successively selected in accordance with a predetermined set of combinations to close corresponding ones of said switches and producing an end signal upon completion of all of said combinations, a judging circuit coupled to the output of said adder for comparing said sum signals with a predetermined reference value to produce an acceptance signal when a predetermined condition with respect to said reference value is fulfilled, and a combination memory coupled to the output terminals of said switch control circuit for updating its content with the current inputs in response to said acceptance signal and supplying its content to utilization means in response to said end signal, said judging circuit including means coupled to the output of said adder for calculating deviation of said sum signal from a predetermined target value, a polarity discriminating comparator coupled to the output of the last said means for discriminating polarity of said deviation to produce first or second polarity signals indicative of said polarity, first and second deviation memories coupled to the output of the last said means for responding respectively to first and second acceptance signals to update their contents with the current input, first and second comparators coupled to the last said means and said first and second deviation memories, respectively, for comparing the output of the last said means with the contents of the memories to produce outputs, respectively, when the absolute value of the former is less than the absolute value of the latter, and first and second logic circuits for responding to the output signals of said first and second comparators and the first and second polarity signals of said polarity discriminating comparator to produce said first and second acceptance signals, said combination memory including a first portion for responding to said first acceptance signal to update its content and a second portion for responding to said second acceptance signal to update its content, said machine further comprising third and fourth comparators coupled to the outputs of said first and second deviation memories, respectively, for comparing the content of said memories with predetermined corresponding deviation ranges to produce outputs, respectively, when the contents fall within said ranges, and means coupled to the outputs of said third and fourth comparators and the outputs of said first and second portions of said combination memory for inhibiting the output from one of the portions of said combination memory corresponding to the other of said third and fourth comparators when at least a predetermined one of said comparators produces an output and inhibiting the output of the portion of said combination memory corresponding to said one of said third and fourth comparators when the last said one comparator produces no output.

4. A combination weighing machine, comprising a plurality of weighing balances for weighing articles respectively to produce electric signals indicative of the measured weights, an adder having a plurality of inputs for summing incoming signals to produce a sum signal, a plurality of controlled normally-open switches coupled respectively between said balances and said inputs of said adder, a switch control circuit having a plurality of output terminals coupled respectively to the control terminals of said switches for producing control signals from those of said output terminals which are successively selected in accordance with a predetermined set of combinations to close corresponding ones of said switches and producing an end signal upon completion of all of said combinations, a judging circuit coupled to the output of said adder for comparing said sum signals with a predetermined reference value to produce an acceptance signal when a predetermined condition with respect to said reference value is fulfilled, and a combination memory coupled to the output terminals of said switch control circuit for updating its content with the current inputs in response to said acceptance signal and supplying its content to utilization means in response to said end signal, said judging circuit including a polarity discriminating comparator coupled to the output of said adder for discriminating the sense of shift of said sum signal from a predetermined target value to produce a first or second polarity signal indicative of said sense, first and second sum memories coupled to the output of said adder for responding to first and second acceptance signals, respectively, to update their contents with the current inputs, first and second comparators coupled to said adder and said first and second sum memories for comparing the output of the former with the contents of the latter, respectively, to produce output signals when the former is nearer said target value than the latter, and first and second logic circuits for responding to the output signals of said first and second comparators and said first and second polarity signals to produce said first and second acceptance signals, said combination memory including a first portion for responding to said first acceptance signal to update its content and a second portion for responding to said second acceptance signal to update its content, said machine further comprising third and fourth comparators coupled to the outputs of said first and second sum memories, respectively, for comparing the contents of said memories with a predetermined allowable range to produce outputs, respectively, when the contents fall within said range, and means coupled to the outputs of said third and fourth comparators and the outputs of said fist and second portions of said combination memory corresponding to the other of said third and fourth comparators when at least one of said comparators produce an output and inhibiting the output of the portion of said combination memory corresponding to said one of said third and fourth comparators when the last said one comparator produces no output.

5. The method of delivering quantities of a product with each quantity being of an acceptable total weight relative to a predetermined reference weight, utilizing a plurality of weighing balances adapted to weigh fractions of said quantity, respectively and for unloading of said quantity fractions therefrom to collect them for delivery; said method comprising for each delivery the steps of presetting at least two ranges of weight having an order of priority about said reference weight; generating the values of combinations of quantity fractions of said product on the weighing balances; selecting two values from said values of combinations of weights, one being greater than and nearest to said reference weight, and the other being less than the nearest to said reference weight; and comparing said two values with said preset ranges of weight and unloading the quantity fractions from the weighing balances contributing to the value which is in the range of higher order of priority.

6. Apparatus for delivering quantities of a product with each quantity being of an acceptable totoal weight relative to a predetermined reference weight; comprising a plurality of weighing balances adapted to weight fractions of said quantity, respectively and for unloading of said product therefrom to collect them for delivery; means for generating the values of combinations of weights of said quantity fractions on the weighing balances; means for comparing said value of combinations of weights with said reference weight to select two values therefrom, one being greater than the nearest to said reference weight, and the other being less than and nearest to said reference weight; and means for comparing said selected two values with at least two ranges of weight having an order of priority and being preset about said reference weight, and means for unloading said product from the weighing balances contributing to the value which is in the range of weight of higher order of priority.

7. Apparatus for delivering quantities of a product with each quantity being of an acceptable total weight relative to a predetermined reference weight; comprising a combination weighing device including a plurality of weighing balances and unloading means for each balance, means for selecting two values of combinations of weights, one being greater than and nearest to said reference weight and the other being less than and nearest to said reference weight, means for storing said values and also information pertaining to the individual weighing balances contributing to said selected values during each cycle of combination operation; means for storing the extreme values of at least two ranges of weight having an order of priority and being preset about said reference weight; a logic circuit for reading said two values of combinations of weights and said information of said weighing balances stored in the first said storing means and said extreme values stored in the last said storing means to select one of said values of combinations of weights which is in the range of weight of the higher order of priority and to output the information of weighing balances contributing to said value; and means for supplying said output information from said logic circuit to said unloading means for unloading said product from the specified weighing balances.

* * * * *

UNITED STATES PATENT OFFICE
CERTIFICATE OF CORRECTION

Patent No. 4,416,341     Dated November 22, 1983

Inventor(s) Takashi Hirano

It is certified that error appears in the above-identified patent and that said Letters Patent are hereby corrected as shown below:

On the Title Page:

Item [73] Assignee should be changed from

"Yamata Scale Company, Ltd., Hyogo, Japan" to read

--Yamato Scale Company, Ltd., Hyogo-ken, Japan--

Signed and Sealed this

Fifth Day of March 1985

[SEAL]

*Attest:*

DONALD J. QUIGG

*Attesting Officer*     *Acting Commissioner of Patents and Trademarks*